Nov. 5, 1968  MASAOMI OSHIMA  3,409,850
MINIATURE INDUCTANCE DEVICE FOR COMMUNICATION
Filed Oct. 28, 1965
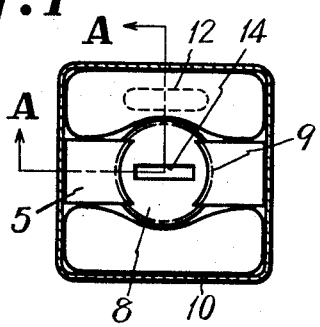
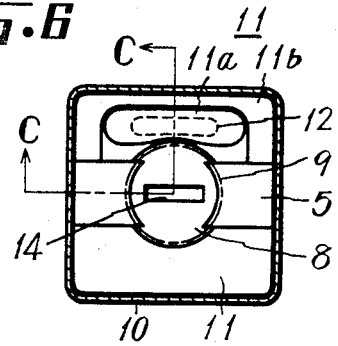
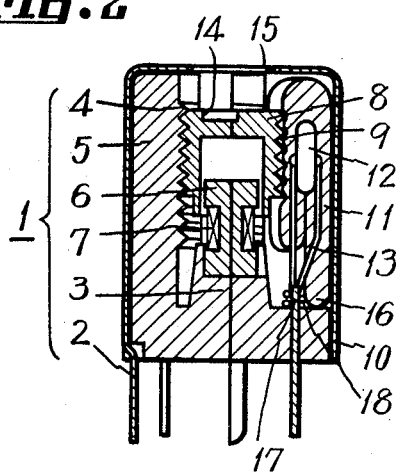
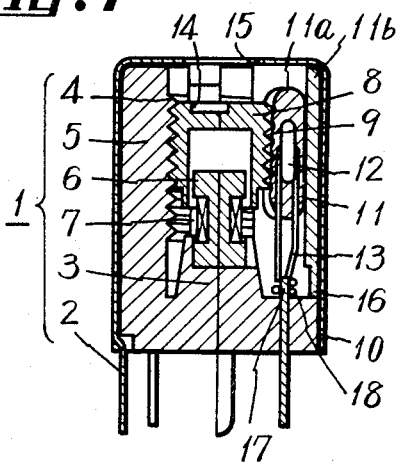
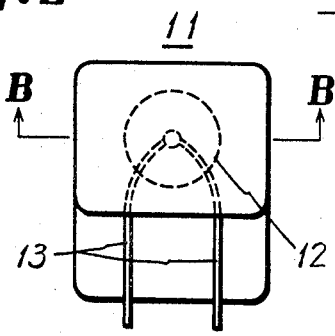
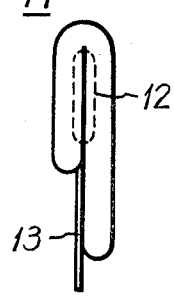
INVENTOR.
M. Oshima
BY
Richards & Geier
ATTORNEYS 3,409,850
MINIATURE INDUCTANCE DEVICE
FOR COMMUNICATION
Masaomi Oshima, 34, Saitobuncho, Kanagawa-ku,
Yokohama-shi, Japan
Filed Oct. 28, 1965, Ser. No. 505,505
4 Claims. (Cl. 334—76)

This invention relates to a miniature inductance device for communication and more particularly to an intermediate-frequency transformer.

It is one object of this invention to provide an inductance device for communication which is miniaturized by enclosing an intermediate-frequency transformer element and a capacitor connected to the coil thereof in a metal shield case.

It is another object of this invention to provide an intermediate-frequency transformer having an intermediate-frequency transformer element and a capacitor cooperating with the coil thereof enclosed in a metal shield case in which the capacitor is wrapped or enveloped in a spacer made of an elastic material and the spacer is disposed between a movable pot core for inductance adjustment of the intermediate-frequency transformer and the inner wall of the metal shield case thereby to ensure complete electrical insulation of a bare lead wire of the capacitor from the inner wall of the metal shield case.

It is still another object of this invention to provide an inductance device for communication having an intermediate-frequency transformer element and a capacitor cooperating with the coil thereof enclosed in a metal shield case in which the capacitor is wrapped or enveloped in a spacer made of an elastic material and the spacer is disposed between a movable pot core for inductance adjustment of the intermediate-frequency transformer and the metal shield case in touch with them thereby to smoothly carry out the adjustment of the movable pot core without tolerance.

Other objects, features and advantages of this invention will become apparent from the following description taken in conjunction with the accompanying drawing, in which:

FIGURE 1 is an enlarged plan view of one embodiment of the miniature transformer of this invention, with the metal case shown in cross section;

FIGURE 2 is a cross-sectional view taken along the line A—A in FIGURE 1;

FIGURE 3 is a front view of the capacitor wrapped or enveloped in a spacer;

FIGURE 4 is its side view;

FIGURE 5 is a cross-sectional view taken along the line B—B in FIGURE 3;

FIGURE 6 is a plan view similar to FIGURE 1, illustrating another example of this invention; and FIGURE 7 is a cross-sectional view taken along the line C—C in FIGURE 6.

Referring to the drawing, one example of the present invention will hereinafter be described. Reference numeral 1 identifies an insulating base made of a plastic material by molding, which comprises a bottom portion 3 having planted thereon pins 2 and a pair of upstanding pieces 5 having screw-threads formed in the opposed inner surfaces thereof which have been provided integrally with the bottom portion 3 during molding. Reference numeral 6 represents a drum-type magnetic core having wound thereon a coil device 7 which is disposed in the center of the bottom portion 3 and reference numeral 8 indicates a movable pot magnetic core having screw-threads 9 to be meshed with those 4 of the upstanding pieces 5. In case of forming a transformer the coil device 7 has at least primary and secondary coils. On the top of the movable pot magnetic core 8 there is provided a groove 14 for engagement with the pointed end of a screwdriver. That is, the pot core 8 is rotated from the outside through an aperture 15 formed in the top of a metal case 10 thereby to move the core 8 up and down along the axis thereof, controlling the inductance.

In the space defined by the upstanding pieces 5, the movable pot core 8 and the metal case 10, there is disposed in touch with them a folded spacer 11 made of a soft or half-hard resin material such, for example, as polyethylene, vinyl chloride, polypropylene or the like, as illustrated in FIGURES 3 to 5. Then, a capacitor 12 of, for example, round flat shape, is held by the spacer 11 and leads 13 from both electrodes of the capacitor are connected to the pin 2 respectively. In this case, the folded outer end 16 of the spacer 11 is extended substantially to the bottom portion 3 between the inner projecting portion 17 of the pin 2 and the inner wall of the metal case 10 so that the connecting end 18 of the lead 13 of the capacitor 12 to the inner projecting portion 17 of the pin 2 is prevented from getting in touch with the inner wall of the metal case 10 by the extended portion 16.

FIGURES 6 and 7 illustrate another example of this invention in which two spacers 11a and 11b are employed, the one spacer 11a holding the capacitor 12 as in the foregoing example and the other 11b being disposed between the spacer 11a and the inner wall of the meal case 10. In this case, the outer end portion 16 of the spacer 11b is extended along the inner wall of the metal case 10 down to the inner surface of the bottom portion 3, serving to electrically insulate the end of the bare lead wire 13 of the capacitor 12 from the metal case 10. The spacers 11a and 11b may be made of the same or different materials. Since other structures of this example are the same as those of the foregoing example, similar components are identified by the same reference numerals and no further detailed explanation will be given in this specification for the sake of brevity.

According to the present invention the capacitor, which is usually connected in parallel to the coil 7 of the transformer element or high-frequency coil element can be enclosed in the case 10 and since the capacitor is wrapped or enveloped in the spacer 11, the capacitor can easily be held insulated in the metal case without causing undesirable contact of the bare lead wire of the capacitor with the inner wall of the metal case. In addition, the transformer can be miniaturized and the spacer 11 resiliently presses the screw-threads 9 of the movable pot core 8 so that the core 8 can smoothly be moved in the axial direction thereof without play or excessive tolerance.

It will be apparent that many modifications and variations may be effected without departing from the scope of the novel concepts of this invention.

What I claim is:

1. A miniature inductance device for communication comprising a main element, said main element consisting of a bottom portion, a plurality of opposed upstanding pieces having screw-threads formed in the opposed inner surfaces thereof which have been provided integrally with said bottom portion by molding an insulating plastic material, a movable pot magnetic core member having screw-threads to be meshed with those of said upstanding pieces and a drum-type magnetic core member having wound thereon a coil and attached to the base portion, a metal shield case enclosing therein said main element, an insulating elastic spacer disposed in the space defined by the upstanding pieces, the movable pot magnetic core member and said metal shield case, and a capacitor wrapped in said spacer.

2. A miniature inductance device for communication as claimed in claim 1, wherein the insulating elastic spacer is folded at the intermediate portion thereof and the capacitor is held therebetween.

3. A miniature inductance device for communication as claimed in claim 1, wherein the insulating elastic spacer is divided into two and the one envelopes the capacitor while the other is disposed between the one and the metal case.

4. A miniature inductance device for communication as claimed in claims 1 and 3 wherein the lower portion of the insulating elastic spacer on the side of the inner wall of the metal case is extended approximately to the inner surface of the bottom portion thereby to electrically insulate the bare lead wire of the capacitor from the inner wall of the metal case.

References Cited

UNITED STATES PATENTS

| | | | |
|---|---|---|---|
| 2,669,700 | 2/1954 | Rauch | 336—83 X |
| 2,757,346 | 7/1956 | Lahaye | 336—136 |
| 2,889,522 | 6/1959 | Friberg | 333—78 |
| 3,060,394 | 10/1962 | Maeda | 336—136 |
| 3,090,907 | 5/1963 | Maeda | 336—136 X |
| 3,092,796 | 6/1963 | Maeda | 336—136 X |
| 3,271,713 | 9/1966 | Oshima | 336—135 X |
| 3,309,640 | 3/1967 | Oshima | 336—92 X |
| 3,135,937 | 6/1964 | Habsburg | 336—136 |

HERMAN KARL SAALBACH, *Primary Examiner.*

W. H. PUNTER, *Assistant Examiner.*